United States Patent Office 2,995,253
Patented Aug. 8, 1961

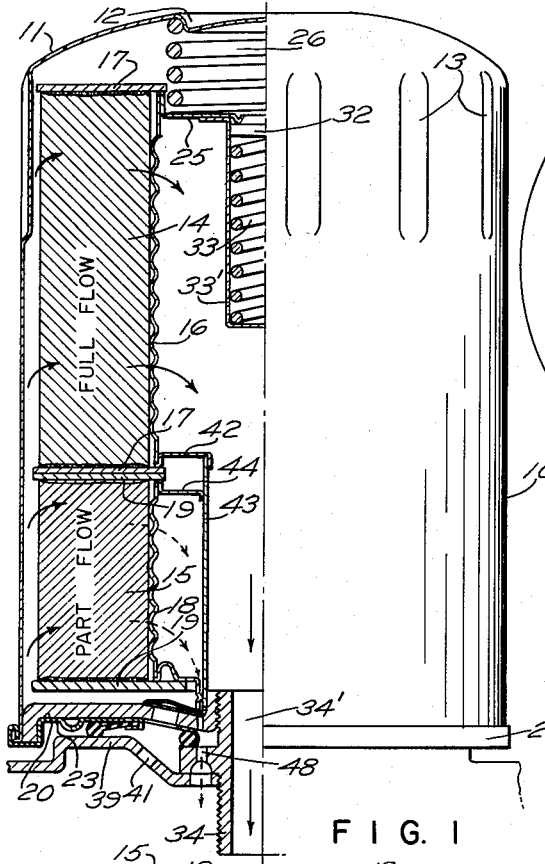

2,995,253
COMBINED FULL-FLOW AND PART-FLOW OIL FILTER
Leo Belgarde, Pawtucket, and Arthur R. Fredrickson, West Warwick, R.I., assignors to Fram Corporation, Providence, R.I., a corporation of Rhode Island
Filed Dec. 10, 1959, Ser. No. 858,642
1 Claim. (Cl. 210—323)

This invention relates to an oil filter of the screw-on throw-away type, provided with both a full-flow and a part-flow filter cartridge.

The screw-on throw-away type of oil filter is now extensively used, as it is easy to remove and replace with a new filter when the cartridge permanently housed therein becomes plugged with dirt. A filter of this type is disclosed in the Coates et al. Patent No. 2,888,141.

Filters of the general type of said patent usually contain a full-flow cartridge, and are constructed so that all of the oil that enters the filter housing normally passes through the cartridge and then directly to the engine bearings. Such a filter cartridge needs to have a relatively open construction so that a sufficient quantity of oil will pass through the cartridge to lubricate and cool the bearings of the running engine. This full-flow type of cartridge will remove coarse dirt particles from the oil delivered to the engine bearings, but will not remove fine dirt particles down to a few microns.

In an effort to clean the oil more effectively, it has been proposed heretofore to mount both a full-flow and a part-flow filter cartridge in the same filter housing, so that most of the oil will pass through the full-flow cartridge, but a small portion of the oil will pass through the part-flow cartridge. In such a construction as used heretofore, the oil from both cartridges passed out of the filter housing usually through the same outlet passage on its way to the engine bearings.

In oil filters of the full-flow type, the cartridge is commonly constructed so that there is a pressure drop of only several pounds across the cartridge. If both a full-flow and a part-flow cartridge are mounted in the same housing as just mentioned, so that both cartridges are subjected to the same pressure differential to force oil through the cartridges, the low pressure drop in the filter housing will force very little oil through the part-flow cartridge.

Having in mind the foregoing, the present invention contemplates an oil filter of the screw-on throw-away type having mounted therein a full-flow cartridge and a part-flow cartridge. Furthermore, the present invention contemplates such a construction wherein the part-flow cartridge is subjected to a pressure differential that is several times as great as the pressure differential across the full-flow cartridge. This effect is secured in the present invention by providing the screw-on type of filter with one oil inlet and two oil outlets, so that the oil from the full-flow cartridge goes directly to the engine bearings, but the oil from the part-flow cartridge is returned directly to the oil sump. In this manner a high pressure drop is obtained across the part-flow cartridge to increase the oil flow therethrough.

In order to secure these results in an oil filter of the screw-on type, the base portion of the filter needs to be so constructed that as the filter is screwed onto a supporting portion of the engine, an oil passage will be formed leading to the interior of the filter housing, and two oil passages will be provided leading from the filter housing, one to the engine bearings and the other to the oil sump.

The oil inlet and the oil outlet leading to the engine bearings can be readily provided as disclosed in the above cited patent. The present invention resides primarily in the combination of parts whereby the act of screwing the oil filter onto the engine supporting means serves also to form an independent oil outlet from the part-flow cartridge to the oil sump to thereby secure a high pressure drop across such part-flow cartridge.

The above and other features of the present invention will be further understood from the following description when read in connection with the accompanying drawing, wherein:

FIG. 1 is a side elevation with parts in section of an oil filter constructed in accordance with the present invention.

FIG. 2, on a larger scale, is a sectional view through the lower portion of the filter shown in FIG. 1.

FIG. 3 is an end view of the filter shown in FIG. 1 looking towards the heavy supporting plate and with the O-ring and its positioning member omitted.

FIG. 4 is a face view of a metal member for retaining an O-ring in its operating position.

FIG. 5 is a face view of a thin disc of spring steel having outwardly projecting fingers; and FIG. 6 is a plan view of an anti-drain gasket which is normally held seated by the spring disc of FIG. 5.

Referring more particularly to FIGS. 1 and 2 of the drawing, the oil filter has a cup-shaped outer shell 10 preferably formed of thin sheet metal drawn to the shape shown. This shell has an integral dome-shaped outer end 11 provided with the annular depressed portion 12 which serves to center a coiled spring to be described. The shell is provided near this end with the longitudinally extending grooves 13 formed by displacing the thin metal wall inwardly.

In the shell 10 are mounted an upper filter element or cartridge 14 and a lower filter element or cartridge 15. The upper cartridge 14 is of the full-flow type and may be formed of pleated paper having relatively open pores or of other filter material which will permit the oil to flow fairly rapidly therethrough. The lower filter cartridge 15 is of the part-flow type and may be formed of pleated paper or of other filter material having fine pores that will remove dirt down to a few microns in size but through which oil can pass only relatively slow. The upper cartridge 14 has the perforated center tube 16 which serves to strengthen the cartridge and provide an inner supporting wall for the filter element. This cartridge is closed at each end by a disc 17 formed of paper or the like adhesively secured to each end of the pleated paper or other filter material. The lower filter cartridge 15 has a similar perforated center tube 18 and the opposite ends of the cartridge 15 are closed by the discs 19 adhesively secured thereto. The full-flow cartridge 14 and part flow cartridge 15 are secured one to the other by adhesively bonding the adjacent end discs 17 and 19 together.

At the lower end of the shell 10 is provided a heavy metal reinforcing plate 20 which has the general shape of a disc and has a central opening surrounded by the upwardly extending sleeve portion 21, which is internally threaded for a purpose to be described. This reinforcing plate is provided at its outer periphery with a downwardly turned annular flange 22. To the lower end of the outer shell 10 is secured the end plate 23 which is fastened to the lower end portion of the shell by the rolled seam 24. The annular flange 22 serves to back up this rolled seam and reinforce the end plate 23 which is bent as shown to conform to such flange. The arrangement is such that the reinforcing plate 20 imparts sufficient strength to the housing formed of the thin metal parts 10 and 23 to enable the housing to withstand a relatively high internal oil pressure without being distorted.

The central bore of the cartridge 14 is closed at its upper end by a metal closure cap 25 which has an outwardly extending flange that rests upon the upper end of the perforated center tube 16 and below the end cap 17. The metal cap 25 is somewhat cup-shaped to receive the lower end of the coiled spring 26. The upper end of this spring encircles the depressed portion 12 of the end cap 11 and the purpose of this spring is to exert a continuous downward pressure on the cartridges 14 and 15.

The end disc 19 of the lower cartridge 15 extends inwardly some distance beyond the filter element as shown in FIG. 2 and has a smaller central opening than the other three end discs. Disposed within this central opening is an annular metal member 27 which has an outer annular flange that projects under the lower end of the center tube 18. This metal member has a downwardly extending annular collar which is supported by the heavy metal plate 20 in a manner to be described.

The metal plate 20 is provided with a number of holes 28 through which oil can pass to enter the filter housing. This end plate also has a smaller hole 29 formed therethrough for a purpose to be described. In order to prevent oil from draining out of the housing when the engine is not running, it is desirable to provide the filter shown with anti-drain back means comprising the gasket 30 best shown in FIG. 6 which rests on top of the plate 20 over the holes 28 and has a central opening that surrounds the upwardly extending sleeve 21 of such plate. Above the gasket 30 is provided a thin spring metal disc 31 having the outwardly extending spring fingers which yieldingly hold the gasket 30 in a position to prevent oil from draining out of the housing, but these fingers will yield to allow oil to be pumped into the housing through the holes 28 as indicated by the arrows in FIG. 2.

The filter shown is provided with a relief valve or bypass valve at its upper end so that oil may reach the engine bearings if the filter cartridges become plugged with dirt. Such relief valve as shown comprises a closure disc 32 preferably formed of textile fibers embedded in a resin. This disc seats against a downwardly extending annular lip of the closure member 25 above mentioned. Such disc is normally held in its closed position by the coiled spring 33 which is held in place by the metal U-shaped housing 33' having ears at its upper end that are secured to the closure member 25. When the oil pressure in the housing reaches a pre-determined pressure, such as ten pounds per square inch, this pressure will depress the disc 32 and permit oil to bypass the cartridges and flow to the engine bearings in a manner to be described.

The oil filter so far described (as above mentioned) is of the screw-on throw-away type and the sleeve portion 21 of the reinforcing plate 20 is internally threaded to be screwed onto the externally threaded upper portion of an adaptor post 34. This post has a central passage 34' through which oil from the full-flow cartridge may pass out of the housing. The post 34 has an annular outwardly extending flange 35 between its ends and a downwardly extending threaded portion adapted to be screwed into a threaded hole formed in the engine block 36. At the bottom of such hole is a passage not shown that leads to the engine bearings to be lubricated. Oil from the engine oil pump passes upwardly through the engine block 36 through the drill hole 37 to enter the oil chamber 38. The upper portion of this chamber is closed by the adaptor plate 39 which is clamped tightly against a face of the engine block by the adaptor post 34, and the outer peripheral portion of such adaptor plate rests upon the annular gasket 40 to form an oil tight seal between this plate and the engine block. The plate 39 has a hole 41 therethrough through which oil from the engine pump can pass to reach the holes 28 in the reinforcing plate, and then into the filter housing as indicated by the arrows.

Most of the constructions so far described may be the same as disclosed in the above cited U.S. Patent No. 2,888,141 except that in such patent a single filter cartridge is employed, whereas in the present construction two filter cartridges are used; one being a full-flow cartridge and the other a part-flow cartridge. The construction of the present invention is such that oil from the full-flow cartridge will reach the bore of the adaptor post 34, whereas the oil from the part-flow cartridge 15 is prevented from mingling with the oil from the full-flow cartridge. To accomplish this the full-flow cartridge is provided near its lower end with an annular collar 42 which has an annular outer lip that lies between the lower end of the center tube 16 and the upper face of the end cap 17. This collar 42 has a downwardly extending annular flange which is welded to a center tube 43. The lower end of this center tube tightly embraces the outer surface of the annular sleeve 21 of the reinforcing plate. The arrangement is such that oil passing through the full-flow cartridge will flow downwardly inside of the tube 43 to reach the bore of the adaptor post 34 and then pass on to the engine bearings. The part-flow cartridge 15 is provided at its upper end with a somewhat similar annular sleeve 44 that embraces the tube 43 and serves to center such tube within the lower cartridge. The oil from the bypass cartridge 15, after passing through the perforated center tube 18, flows downwardly as indicated by the arrows in FIG. 1 between the perforated tube 18 and the non-perforated inner tube 43, and then flows downwardly through the lower annular sleeve portion of the element 27. This sleeve portion is spaced slightly from the tube 43 by several projecting lugs 45 shown in FIG. 2. The gasket holddown spring 31 shown in FIG. 5 is provided with several inwardly projecting lugs 46 which space this ring slightly from the annular sleeve portion 21 of the reinforcing plate 20, and this spring 31 is provided with laterally extending ears 47 adapted to be engaged by the inner bore of the gasket 30 to space this gasket slightly from the sleeve 43. This construction allows the oil from the part-flow filter to reach the small hole 29 formed in the heavy reinforcing plate 20 to pass downwardly through such hole and then through a hole 48 in the adaptor post 34, and through a hole 49 in the adaptor plate 39 to reach a drill hole 50 in the engine casting leading directly to the engine sump.

Since the filter of the present invention is of the screw-on type and is adapted to be screwed on to the adaptor post 34 to mount such filter in its operating position, it is important to provide gasket means whereby the oil passing into the filter housing through the holes 41 and 28 will be kept separate from the oil passing out of such housing by means of the small hole 29. The oil passing into the filter housing is confined by an annular gasket 51 having a thin annular flange portion adapted to be engaged and held by an annular lip portion of the end plate 23 formed adjacent its central opening. This lip portion serves to retain the annular gasket 51 in its operating position. The gasket 51 prevents oil from escaping between the end of the filter and the adaptor plate 39 as it flows from the pump into the filter housing. The oil from the part-flow cartridge upon passing downwardly through the hole 29 is confined by providing an O-ring type of gasket 52 which is confined between the upper face of the portion 35 of the adaptor post and the lower face of the O-ring positioning disc 53, which disc has an annular collar 54 shaped to engage and retain the O-ring in its operating position. This disc 53 has the cut out notches 55 to clear the holes 28 in the reinforcing plate 20 so as not to interfere with the flow of oil through the holes 28. The disc 53 is of a size to fit tight against the annular inner periphery of the end plate 23.

Having described the various parts of the filter of the present invention, its operation will now be described. The oil from the oil pump travels, as indicated by the arrows, through the passages 37, 41 and 28 to reach the interior of the metal shell 10 where it contacts the outer surface of the full-flow cartridge 14 and part-flow cartridge 15. The oil that passes through the full-flow cartridge flows down in the inner tube 43 and the bore of the adaptor post 34 and then to the engine bearings.

The oil that passes through the part-flow filter is confined between the bore of this filter and the outer wall of the tube 43 to pass downwardly within the lower sleeve portion of the annular member 27. It then passes between the inner diameter of the non-return gasket 30 and tube 43 to reach the holes 29, 48 and 50 and then passes to the engine sump. When the filter is screwed down on the adaptor post 34, a space will remain between the portion 35 of this post and the base of the filter, but this space is closed by the O-ring 52 which is retained in place by the metal disc 53. As a result the oil passing through the holes 41 and 28 to reach the filter is kept separate from the oil passing through the holes 29, 48 and 49 to reach the oil sump.

The pressure drop across the full-flow cartridge 14 is normally only a few pounds, as considerable pressure is required to force oil to the engine bearings. The pressure drop across the part-flow cartridge 15 when the discharge from this cartridge is delivered directly to the engine sump will be several times that of the pressure drop across the full-flow cartridge. Therefore, as a result of the present invention, a much larger amount of oil will be forced through the part-flow cartridge than would be the case if the oil from both cartridges went directly to the engine bearings. This will cause the present filter to clean the oil much more effectively than the screw-on throw-away filters used heretofore.

The non-return gasket 30 provided to prevent oil from draining out of the shell 10 when the engine is not running, will not prevent oil from the part-flow cartridge from draining back to the sump. This is prevented by providing a spring operated ball valve 56 in the passage 50. Such valve is normally held seated against a member 57 by the light coiled spring 58. A slight oil pressure will open this valve so that such oil can return to the oil sump.

Having thus described our invention, what we claim and desire to protect by Letters Patent is:

An oil filter of the screw-on throw-away type adapted to be screwed by its rotation to its operating position adjacent an engine provided with a base plate for the filter, comprising a housing having a fine filter element and a coarse filter element permanently contained therein, said housing having a heavy reinforcing plate permanently secured at one end thereof and provided with a central hole and concentric threads so that the filter can be screwed by rotation to its operating position adjacent said engine base plate, the housing when in its operating position having an off-center passage leading to both cartridges, an off-center passage leading from one cartridge and a central passage including said central hole leading from the other cartridge, and having two concentric sealing gaskets adjacent the base plate and reinforcing plate and arranged so that when compressed therebetween by the screw-on rotation of the filter two separate passages are formed and the gaskets keep the oil entering through one off-set passage from contacting the oil leaving through the other off-set passage.

References Cited in the file of this patent

UNITED STATES PATENTS

| | | |
|---|---|---|
| 2,748,949 | James | June 5, 1956 |
| 2,888,141 | Coates et al. | May 26, 1959 |